Dec. 29, 1970          M. H. CROWELL          3,551,840
PULSE CODE MODULATED OPTICAL MASER
Filed Jan. 18, 1965                    2 Sheets-Sheet 1
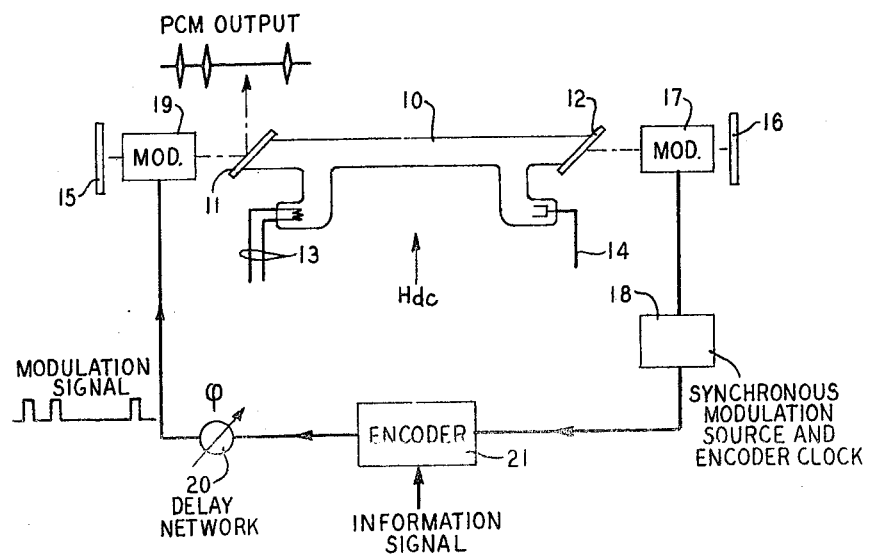
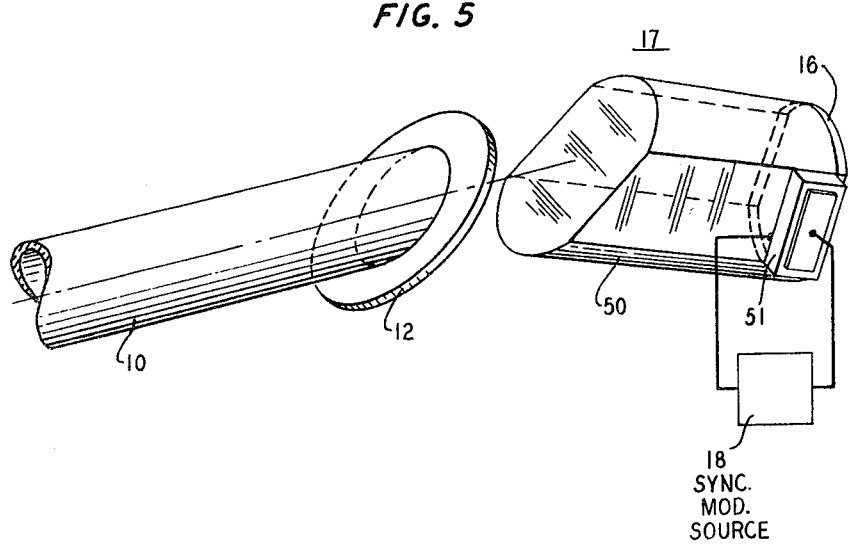
INVENTOR
M. H. CROWELL
BY
ATTORNEY

United States Patent Office 3,551,840
Patented Dec. 29, 1970

3,551,840
PULSE CODE MODULATED OPTICAL MASER
Merton H. Crowell, Morristown, N.J., assignor to Bell Telephone Laboratories, Incorporated, New York, N.Y., a corporation of New York
Filed Jan. 18, 1965, Ser. No. 426,063
Int. Cl. H01s 3/10
U.S. Cl. 331—94.5                                      8 Claims

ABSTRACT OF THE DISCLOSURE

This application describes a pulse code modulated optical maser employing two intracavity modulators. The first modulator is an intracavity synchronous modulator used to mode lock the laser and, thereby, generate a train of optical pulses. Brewster windows, or other polarization selective means, are employed to polarize the optical wave energy along a given direction.

The second modulator rotates the direction of polarization of selected pulses in accordance with the information supplied to the second modulator. The rotated pulses are then diverted out of the laser cavity by the polarization selective means.

Improved performance is obtained by constructing the first modulator and one of the cavity mirrors as a unit.

---

This invention relates to pulse modulated lasers.

The development of the laser has made possible the generation of coherent electromagnetic wave energy in the infrared, the visible and the ultraviolet portions of the frequency spectrum, hereinafter to be referred to collectively as "optical" waves.

It is an object of the present invention to utilize the laser as a source of modulated wave energy in a pulse code modulated communications system.

The characteristics of a mode-coupled laser operating as a pulse regenerative oscillator (PRO) has been described by L. E. Hargrove, R. L. Fork and M. A. Pollack in a letter entitled "Locking of He-Ne Laser Modes Induced by Synchronous Intracavity Modulation," published in the July 1, 1964 issue of Applied Physics Letters, 5, pp. 4 and 5. (Also see the copending application of L. E. Hargrove, Ser. No. 362,319, filed Apr. 24, 1964, and assigned to applicant's assignee.) As indicated in this letter and application, a laser operating as a pulse regenerative oscillator is characterized by an output consisting of a train of very narrow pulses. The peak power of these pulses may be as much as twenty times the average output power from the laser while the width of each pulse is approximately equal to the reciprocal of the oscillating line bandwidth. Typically, the pulse width is less than one nanosecond.

Thus, a pulse regenerative oscillator is an ideal energy source for a pulse code modulated system.

Previous arrangements for modulating a laser by means of an intracavity modulator have not been reliable. It has since been discovered that this lack of reliability was due to the fact that the laser may, under certain conditions, operate intermittently as a pulse regenerative oscillator under conditions when such operation is neither contemplated nor desired. The occasional presence of the resulting optical pulses would produce intolerable distortion in the system. Thus, a laser must be operated in a controlled manner that insures that the modes are either always coupled or always uncoupled.

In accordance with the present invention, a laser is modulated by means of two intracavity modulators. The first of these modulates the optical beam in a manner to insure that the modes are always coupled, thereby producing a train of optical pulses. The second intracavity modulator couples a small portion of the wave energy of some of the pulses out of laser cavity in accordance with the information supplied to the second modulator. The resulting output is a pulse code modulated signal in which spurious effects resulting from natural mode-coupling are eliminated, and in which the modulation sensitivity is increased from twenty to forty times (approximately equal to the number of coupled modes) as compared to uncoupled mode operation.

It has also been discovered that the optimum location for the mode-coupling modulator is close to one of the laser cavity mirrors. Thus, in accordance with a feature of the preferred embodiment of the present invention, the mode-coupling modulator is made an integral part of the substrate which provides the mechanical support for one of the cavity mirrors. In the specific illustrative embodiment described, modulation is achieved in a fused quartz substrate by launching an acoustic wave directly into the substrate by means of a suitable transducer located immediately adjacent to the mirror surface. The advantages of this feature of the invention are that the modulator is placed at its optimum location (i.e., very close to one of the cavity mirrors); the power loss of the cavity is minimized since there is only one air-to-quartz boundary surface for this modulator; and the modulator is inherently stable mechanically.

These and other objects and advantages, the nature of the present invention, and its various features, will appear more fully upon consideration of the various illustrative embodiments now to be described in detail in connection with the accompanying drawings, in which:

FIG. 1 shows, in block diagram, the basic components of an optical pulse code modulator in accordance with the invention;

FIG. 5 shows an acoustic modulator constructed as an integral part of one of the cavity mirrors.

Figure 2:
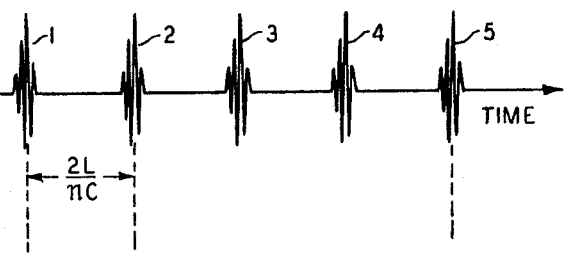
FIG. 2 shows the pulses produced in the laser as a result of mode-coupling.

Referring to the drawings, FIG. 1 shows an illustrative embodiment of the invention comprising a laser oscillator and a pair of intracavity modulators.

The oscillator, which for purposes of illustration is depicted as a gas laser, comprises a sealed, elongated tube 10 within which there is a gaseous active medium. To minimize the effect of reflections, the ends 11 and 12 of tube 10 are inclined at the Brewster angle. A direct current power source (not shown) is connected to electrode leads 13 and 14 for supplying the power necessary to produce, and to maintain, a gas discharge within tube 10 and to establish thereby a population inversion in the energy level system of the active medium. It is to be understood, however, that other means, well known in the art, can be employed to produce a population inversion in the maser material. (For a more detailed discussion of gas lasers see "The Laser," by A. Yariv and J. P. Gordon, published in the January 1963 issue of the Proceedings of the Institute of Radio Engineers.)

Tube 10 is located within an optical cavity defined by a pair of mirrors 15 and 16. Both mirrors typically are made as highly reflective as possible since the useful output, in the illustrative embodiment to be described, is obtained by reflection off one of the Brewster windows rather than by transmission through one of the cavity mirrors.

In accordance with the present invention, two modulators are included within the optical cavity. The first of these, placed adjacent to mirror 16, is the mode-coupling modulator 17. This modulator can be of the ultrasonic type described in the above-mentioned copending application by L. E. Hargrove, or it can be of any other design known in the art. Such other modulators can comprise combinations of electro-optical materials and suitably oriented polarization prisms.

As taught by Hargrove, mode-coupling of the laser is achieved by internally modulating the laser at a synchronous frequency, where the term "synchronous frequency" is understood to define a frequency within a band of frequencies whose center is nominally given as $nc/2L$, where $n$ is any prescribed integer, $c$ is the velocity of propagation, and $L$ is the effective length of the optical cavity for the cavity mode at the center of the Doppler-broadened gain curve.

The synchronous modulating signal is supplied to modulator 17 by a synchronous modulation source 18.

When synchronously modulated, the modulation period is equal to $1/n^{th}$ of the time required for the wave energy to travel twice the length of the cavity. Thus, each time a given portion of the intracavity wave train makes a transit through modulator 17, the modulation phase is the same. This results in successive reinforcement of the modulation effect and assures that the modulation envelopes of the various contributions to the total beam are in phase. Above a particular threshold of modulation, which results in approximately 100 percent modulation of the cavity wave, all the modes couple together with a well defined amplitude and phase. This condition is referred to as "locked," or "mode-coupled."

In the locked state, the laser wave consists of packets of optical energy, or pulses, whose repetition rate is equal to the modulation frequency. This optical pulse train is depicted in FIG. 2, which shows five pulses designated 1, 2, 3, 4 and 5.

The information signal is encoded into a binary code modulation signal in an encoder 21 of any suitable type. The pulse-encoded signal is then applied to a second intracavity modulator 19. To ensure that the symbol rate of the modulation signal is the same as the repetition rate of the optical pulses produced by modulator 17, timing signals for the encoder 21 are derived from the synchronous modulation source 18. In this capacity, source 18 also functions as a clock for the encoder.

It is the function of modulator 19 to extract a portion of the energy within the optical pulse train in accordance with the information supplied to modulator 19 by the modulation signal. One convenient way of doing this is to take advantage of the fact that the optical wave energy within the cavity is highly polarized in a preferred direction by the Brewster windows 11 and 12. (See Fundamentals of Optics by F. A. Jenkins and H. E. White, McGraw-Hill Book Company, Inc., 1957, Third Edition, p. 491.) By making use of the birefringent properties of certain crystals, such as, for example, KDP (potassium dihydrogen phosphate), when subjected to an electric field (in the manner described by K. Gürs and R. Müller in their paper "Internal Modulation of Optical Masers," published in the 1963 Proceedings of the Symposium on Optical Masers, Polytechnic Press, Brooklyn, N.Y.), a component of energy can be induced that is polarized in a direction perpendicular to the preferred direction. A portion of this induced component of energy is reflected out of the optical cavity by the Brewster window 11, as indicated in FIG. 1, or separate means for reflecting this induced component of energy can be provided by a separate element or in association with modulator 19.

Thus, in the embodiment of FIG. 1, modulator 19 comprises some form of polarization rotator for changing selectively the polarization of the optical wave energy, and thereby permitting the extraction of a portion of the wave energy contained within selected optical pulses. Modulator 19 ordinarily can be located anywhere within the optical cavity. However, it is preferable that it be located immediately adjacent to the other cavity mirror 15.

To properly phase modulator 19 with respect to the optical pulses produced by modulator 17, a variable delay network 20 is located in the line connecting encoder 21 and modulator 19. When properly adjusted, the modulation pulses and the optical pulses arrive at modulator 19 in time-coincidence.

Figure 3:
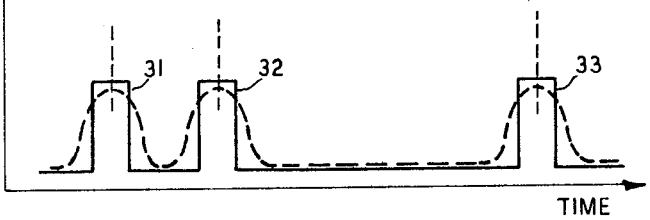
FIG. 3 shows a pulse-encoded modulation signal having the same symbol rate as the mode-coupled laser and adjusted in time-coincidence with the laser pulses.
Figure 4:
FIG. 4 shows the resulting output signal for the conditions depicted in FIGS. 2 and 3.

In operation, modulator 17 establishes the optical pulses depicted in FIG. 2. In the absence of a modulation signal, these pulses traverse modulator 19 unaffected and essentially none of the energy contained within these pulses is extracted from the optical cavity. In the presence of a modulation signal, however, a small portion of the optical energy within selected optical pulses, typically one or two percent, is coupled out of the cavity as a result of the action of modulator 19 upon the optical pulses. Referring to FIGS. 2 and 3, the coincidences of optical pulses 1, 2 and 5 and modulation pulses 31, 32 and 33, respectively, would result in the output pulse train shown in FIG. 4.

It will be noted that the modulation pulses can be substantially broader than the optical pulses, as indicated by the dotted curves in FIG. 3. In fact, this is preferable as it makes the phase adjustment for producing the proper timing of the modulation pulses less critical.

While Hargrove et al. recognized the desirability of placing the mode locking modulator as close to one of the mirrors as possible, the use of a separate element as a modulator placed a practical limitation upon how close to the mirror the modulator can be located. Applicant has found that if the modulator is an integral part of the mirror structure, it is possible to effectively modulate the optical wave at the mirror surface and, thereby, to operate the laser as a pulse regenerative oscillator without reduction in average power. On the other hand, if the modulator is not located at a mirror surface, the presence of the modulator tends to decrease the average output power.

To achieve the ultimate in closeness, applicant has constructed his modulator 17 as an integral part of the mirror structure. As shown in FIG. 5, modulator 17 comprises the fused quartz substrate 50, which provides the mechanical support for mirror 16. Modulation is achieved by launching an acoustic wave in the fused quartz substrate in a direction perpendicular to the direction of propagation of the optical wave by means of a suitable transducer 51, mounted on one side of the substrate immediately adjacent to the mirror surface. Illustrative of a suitable transducer is an x-cut quartz crystal across which a radio frequency signal is impressed.

The acoustic wave is reflected back and forth in the fused quartz substrate, producing a standing acoustical wave. It has been shown that such a standing wave forms a time-varying volume diffraction grating. This diffraction grating acts as a time-varying attenuator for the lowest order diffraction pattern by deflecting energy into the higher order diffraction patterns. (For a more detailed discussion of the diffraction of light by standing ultrasonic waves see C. V. Raman and N. S. Nath. Proceedings of the Indian Academy of Science, A2, 406 (1935); 3, 75 (1936) B. D. Cook and E. A. Hiedemann, Journal of the Acoustical Society of America, 33, 945 (1961). Also see the article entitled "Ultrasonic-Diffraction Shutters for Optical Maser Oscillators," by A. J. De Maria, published in the October 1963 Journal of Applied Physics.)

When disposed within the optical cavity, the fused quartz substrate of modulator 17 is inclined at the Brewster angle in order to reduce reflection losses in the cavity. In addition, losses are further minimized as the modulator has only one air-to-quartz boundary surface.

As noted hereinabove, the width of the pulses produced by a mode-coupled laser is approximately equal to the oscillating line bandwidth. In a 6328 A. He-Ne laser the line width is approximately equal to 2 kmc., whereas in the 4880 A. Argon-Ion laser it is approximately 4 kmc.

It has been demonstrated by K. L. Fork and C. K. W.

Patel in their letter entitled "Magnetic Field Tuning of Gaseous Laser Oscillators," published in the February 1964 issue of the Proceedings of the Institute of Electrical and Electronic Engineers, pp. 208 and 209, that the oscillating line width of a gaseous maser can be substantially increased by the application of a magnetic field. Thus, a transverse magnetic field can be used to decrease the pulse width of the optical pulses produced by the mode-coupled laser.

The presence of the magnetic field causes the energy levels of the laser medium to split, due to the Zeeman effect, by an amount that is proportional to the amplitude of the magnetic field. For example, Fork et al. report that the oscillating line width of a 6328 A. He-Ne laser can be increased from approximately 2 kmc. to 14 kmc. by the application of a 4 kilogauss field. This, therefore, provides a convenient way for controlling the pulse width of the optical pulse code modulator shown in FIG. 1. Accordingly, a variable magnetic field, indicated by the arrow labeled $H_{dc}$ in FIG. 1, can be provided by suitable means well known in the art (not shown) for this purpose.

It is to be understood that the above-described arrangement is merely illustrative of one of the many possible specific embodiments which can be devised to represent applications of the principles of the invention. For example, while the embodiment of FIG. 1 utilizes a gas laser, the principles of the present invention are equally applicable to other types of lasers. Thus, numerous and varied other arrangements can readily be devised in accordance with these principles by those skilled in the art without departing from the spirit and scope of the invention.

What is claimed is:
1. An optical wave pulse code modulator including, in combination;
   a laser comprising an active medium located within a cavity resonator;
   first modulation means located within said cavity for mode-coupling said maser to produce a train of optical pulses;
   and second modulation means located within said cavity for causing a portion of the wave energy associated with said pulses to be extracted from said cavity in accordance with the signal information supplied to said second modulation means.
2. In combination:
   a laser for generating optical wave energy comprising a gaseous medium contained within an elongated cylindrical tube and disposed within a cavity resonator;
   polarization selective means associated with said laser for polarizing the wave energy within said cavity in a first direction;
   a first modulator located within said cavity for synchronously modulating said laser to produce a train of pulses;
   and a second modulator located within said cavity for rotating the direction of polarization of at least a portion of the wave energy associated with selected pulses in accordance with signal information supplied to said second modulator, whereby said rotated pulses are deflected out of said cavity by said polarization selective means.
3. The combination according to claim 2 wherein;
   said polarization selective means comprise Brewster windows at the ends of said elongated cylinder.
4. The combination according to claim 2 wherein;
   said cavity comprises a pair of mirrors;
   and wherein said first means comprises an ultrasonic modulator disposed immediately adjacent to one of said mirrors.
5. For use in a maser comprising an active maser material located within a cavity resonator defined by a pair of mirrors spaced apart along a first direction;
   an intracavity acoustical modulator comprising a fused quartz element in contact with one of said mirrors;
   and a transducer for launching acoustical waves within said quartz element in a second direction transverse to said first direction.
6. An optical pulse code modulator comprising, in combination;
   a pulse regenerative maser oscillator including an active maser medium located within a cavity resonator,
   a first modulator located within said cavity,
   and a source of wave energy for driving said first modulator at a frequency and amplitude to mode-couple said maser;
   a source of signal information;
   means for encoding said signal information into a binary pulse code modulation signal having a symbol rate equal to said frequency;
   a second modulator located within said cavity;
   means for applying said encoded modulation signal to said second modulator;
   delay means for bringing said modulation signal pulses into time coincidence with the pulses generated by said mode-coupled maser;
   and means included within said cavity for extracting wave energy from said cavity in accordance with said modulation signal.
7. The combination in accordance with claim 6 wherein;
   said cavity comprises a pair of mirrors;
   and wherein said first modulator is located immediately adjacent to one of said mirrors;
   and said second modulator is located immediately adjacent to the other of said mirrors.
8. The combination in accordance with claim 6 wherein said maser medium is gaseous;
   and wherein means are provided for applying a variable magnetic field to said medium in a direction perpendicular to the direction of propagation of the pulses generated by said maser.

References Cited

UNITED STATES PATENTS 3,229,223   1/1966   Miller _____ 250—199X

OTHER REFERENCES

Yariv: Proc. I.E.E.E. "Electro-Optic Frequency Modulation in Optical Resonators," vol. 52, No. 6, pp. 719–720, June 1964.

Hargrove et al.: Applied Physics Letters, "Locking of He-Ne Laser Modes Induced by Synchronous Intracavity Modulation," vol. 5, No. 1, pp. 4–7, July 1, 1964.

White et al.: Applied Physics Letters, "Frequency Stabilization of Single Mode Gas Lasers," vol. 5, No. 5, pp. 97–98, Sept. 1, 1964.

Massey et al.: Applied Physics Letters, "Generation of Single-Frequency Light Using the FM Laser," vol. 6, No. 1, pp. 10–11, Jan. 1, 1965.

RODNEY D. BENNETT, JR., Primary Examiner

D. C. KAUFMAN, Assistant Examiner

U.S. Cl. X.R.

250—199; 332—7.51, 11